Figure 1:
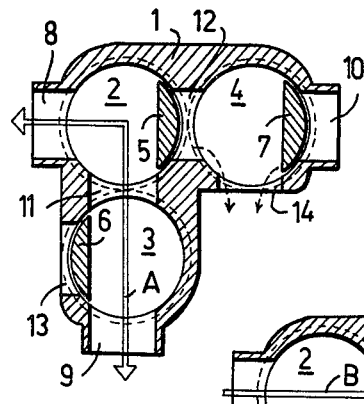

United States Patent [19]

Niskanen

[11] 4,196,752

[45] Apr. 8, 1980

[54] GROUP VALVE FOR TWO SEPARATE LIQUID SUPPLY LINES

[75] Inventor: Erkki P. Niskanen, Helsinki, Finland

[73] Assignee: Koltek Oy, Helsinki, Finland

[21] Appl. No.: 935,823

[22] Filed: Aug. 22, 1978

[30] Foreign Application Priority Data

Aug. 24, 1977 [FI] Finland .................................. 772518

[51] Int. Cl.² ............................................. F16K 11/14
[52] U.S. Cl. ................................... 137/865; 137/240; 137/887
[58] Field of Search ........................ 137/240, 865, 887

[56] References Cited

U.S. PATENT DOCUMENTS 4,108,199  8/1978  Bonafous .............................. 251/306

Primary Examiner—Gerald A. Michalsky
Attorney, Agent, or Firm—Ladas, Parry, Von Gehr, Goldsmith & Deschamps

[57] ABSTRACT

A group valve for selectively connecting two liquid supply lines separately to a container. The valve comprises a housing with three chambers, one of which is separately connected to the others communicating with a respective liquid line. In each chamber there is a rotary slide, said slides cooperating to at each particular time open one line and close the other. In order to prevent leakage from one line to the other said two chambers communicating with the liquid lines, respectively, are provided with an outlet to the atmosphere, said outlet of each chamber being closed by the rotary slide when the liquid line is open and open when the line is closed.

6 Claims, 4 Drawing Figures

GROUP VALVE FOR TWO SEPARATE LIQUID SUPPLY LINES

This invention relates to a group valve for selectively connecting two liquid supply lines separately to a container for conducting liquids into and out of said container, comprising a housing with three valve chambers, each chamber being provided with a liquid connection of its own and one of said chambers being separately connected to the two other chambers through a connecting channel, and further comprising a rotary slide mounted in each chamber, said slides being operationally coupled to each other so that the flow communication between said connections at each particular time is open through one connecting channel and closed through the other connecting channel.

In various industrial treatment processes, as in dairies, in the food industry and in soft drink factories, two liquid supply lines often have to be alternately connected to a container in order to prevent the liquids from getting mixed up with each other. For example, in dairies milk cisterns must be washed from time to time whereby it must be secured that wash liquid is lead into the cistern only after the product line has been reliably separated from the wash line.

For the separation of different liquid supply lines from each other, various 3- and 4-chamber valves have been developed in which the lines can be separated by means of one or two slides so as to provide even a double closure between the liquid supply lines. In spite of this, there is always a risk that one or some of the slides close untightly whereby liquid may leak past the slides and thus get into the other liquid supply line.

It has been previously proposed to couple to the liquid supply lines, after the group valve, separate stop valves connecting the supply line at each particular time disconnected from the through-flow to a pressureless space (the atmosphere) so that any liquid leaking through the group valve may be discharged into the pressureless space and, accordingly, will not get into the disconnected supply line. When this supply line is again connected for a flow through the group valve, the communication of the supply line to the pressureless space must, of course, be closed. The use of separate stop valves thus requires special drive mechanisms the operation whereof, moreover, must be synchronized with the operation of the group valve, which makes the arrangement complicated and expensive.

Also various stop valves have been previously suggested in which grooves or the like are made in the valve housing at the sealing surface of the connection, said grooves communicating with the atmosphere through a hole in the valve housing and being covered by the sealing surface of a closing means in the form of a slide or plate when the closing means is located in the position which closes the connection. Liquid leaking past the closing means is thus discharged from the valve through the grooves and the holes without getting entirely past the closing means. The disadvantage of such a construction is, however, that when the closing means is moved to the position opening the connection the hole extending through the housing is uncovered, which causes leaking of liquid out from the valve or suction of air into the valve, which cannot be allowed, in particular, in the food industry.

It is the object of this invention to provide a group valve in which both liquid supply lines will be separated from each other through a pressureless space, where in the connection to the pressureless space will be tightly closed when the flow of liquid is connected to take place through the corresponding valve chamber. This object is achieved by means of the group valve according to the invention, wherein each of the chambers connected to said common chamber is provided with an outlet opening arranged in relation to said connections is said chambers in such a way that each slide closes said outlet opening when located in a position where the communication between connection in the chamber and the connecting channel is open.

According to the invention there is provided a group valve which is provided with two connections which can be opened or closed from the valve chambers to a pressureless space —one connection for each liquid supply line —and in which the connections are opened or closed by means of slides already included in the valve as the slides operationally coupled to each other are moved to different positions to produce both flow paths through the valve. Accordingly, no special control mechanisms are required for opening and closing the connections. Because the connection is tightly closed as the liquid flow takes place through the corresponding valve chamber, there will be no harmful communication from the liquid supply line to the atmosphere when the supply line is under pressure or suction.

Figure 2:
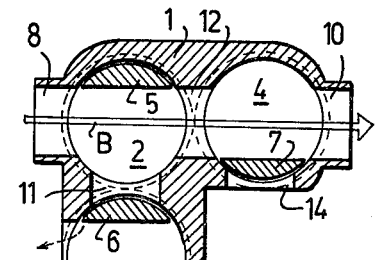
Figure 4:
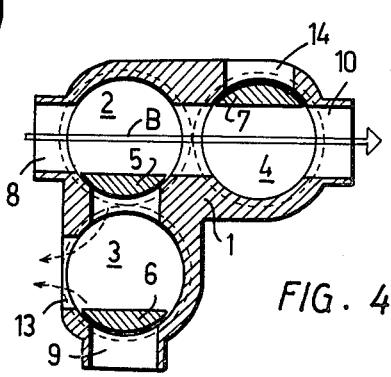
Figure 3:
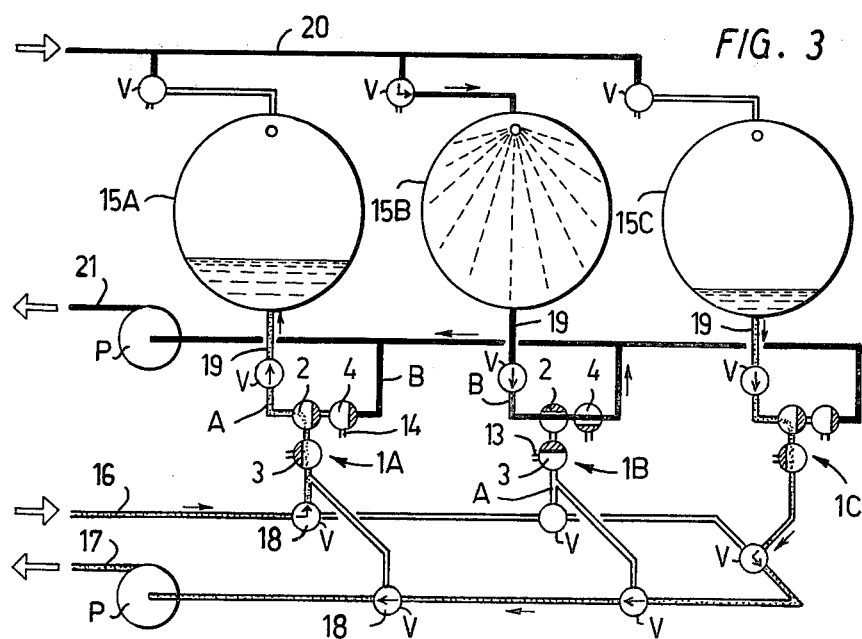

The invention will be described in more detail in the following with reference to the accompanying drawing, wherein FIGS. 1 and 2 show schematically in cross-section the structural and functional principle of a valve according to the invention, in two different operation positions of the slides, FIG. 3 illustrates an application of the group valve, and FIG. 4 illustrates an alternative embodiment of the valve.

The group valve shown in FIGS. 1 and 2 comprises a housing 1 provided with three axially parallel valve chambers 2, 3 and 4. In each chamber there is rotationally mounted a rotary slide 5, 6, 7 and to each chamber is connected an inlet/outlet connection 8, 9 and 10, respectively. One chamber 2 is connected to the two other chambers 3, 4 by means of connecting channels 11 and 12, respectively.

As appears from FIGS. 1 and 2, the rotary slides are mutually arranged so that the slides are always positioned in parallel with each other, and for this purpose the slides are operationally coupled together by means of gear wheels, as shown diagrammatically by means of broken lines. The valve thus forms in the positions shown in both Figures two separate flow paths, for example, a product line A and a wash line B.

According to the invention there is formed in the chamber 3 an outlet opening 13 leading to the atmosphere and in the chamber 4 an outlet opening 14 so that the slide 6 in the chamber 3 closes the opening 13 when the slide is located in a position where the slide has opened the flow path A between the connection 9 in the chamber 3 and the connection 8 in the chamber 2 through the connecting channel 11 (FIG. 1). Correspondingly, the slide 7 in the chamber 4 closes the opening 14 when the slide is located in a position where the slide has opened the flow path B between the connection 10 in the chamber 4 and the connection 8 in the chamber 2 through the connecting channel 12 (FIG. 2).

It will be noted that when the product line A is concerned (FIG. 1) it is separated from the connection 10 in the chamber 4 communicating with the wash line, by means of both slides 2, 4, while the outlet opening 14 in the chamber 4 is open. In case of leakage from the chamber 2 past the slide 5 into the chamber 4, the leaked product will be discharged from the chamber 4 through the opening 14 outside the valve. Should again wash liquid leak from the connection 10 past the slide 7 into the chamber 4, also this liquid will flow from the chamber 4 through the opening 14 outside the valve, as shown with broken lines. No liquid can, accordingly, flow from the product line into the wash line and vice versa. The slide 6 in the chamber 3 has closed the outlet opening 13 and, consequently, the product line A is separated also from the atmosphere.

When the wash line B is concerned (FIG. 2), it is separated from the connection 9 in the chamber 3 communicating with the product line, by means of the slide 6, while the outlet opening 13 in the chamber 3 is open. Should wash liquid flow from the chamber 2 past the slide 6 into the chamber 3, the leaked wash liquid will be discharged from the chamber 3 through the opening 13 outside the valve. The slide 7 in the chamber 4 has closed the outlet opening 14 and, consequently, the wash line B is separated also from the atmosphere.

FIG. 3 illustrates the operation of the group valve when applied to a milk storage system known per se. In this Figure, reference numeral 15 indicates a milk storage cistern. Reference numeral 16 indicates a milk supply pipe system and 17 a milk drain pipe system which are connected through stop valves 18 to group valves 1A, 1B and 1C, and further through a pipe system 19 to the corresponding cistern. Reference numeral 20 indicates the feed pipe system for wash liquid to the cistern. In the case shown in FIG. 3, the left-hand cistern is being filled, the middle cistern is being washed and the right-hand cistern is being emptied. Milk is being supplied under pressure to the cistern 15A through the valve 1A through the left-hand chambers 2, 3 along the product line A, while the right-hand chamber 4 is separated from the wash line B. It will be noted that both lines are, in addition to the slides, separated from each other also by a pressureless space, i.e., the chamber 4 is connected to the atmosphere through the outlet opening 14. Wash liquid is being drained under suction from the middle cistern 15B through the upper chambers 2, 4 along the wash line B, while the chamber 3 communicating with the product line A is separated from the wash line. It will again be noted that both lines are, in addition to the slides, separated from each other also by a pressureless space, i.e., the chamber 3 is connected to the atmosphere through the opening 13.

If the group valve is used under conditions where suction or pressure is applied also to the connection 9 of the chamber 3, while the valve is coupled for the wash line (FIG. 2), the valve is preferably constructed according to the one shown in FIG. 4. In this Figure, the slide 6 in the chamber 3 closes the connection 9 when the valve is coupled for the wash line. When the valve is coupled for the product line the slides are located in the positions shown already in FIG. 1. The only structural difference to the embodiment shown in FIGS. 1 and 2 is the location of the opening 14' of the chamber 4 on the diametrally opposite side of the chamber.

The drawing and the appended specification are only intended to illustrate the idea of the invention. In its details, the valve according to the invention may vary considerably within the scope of the claims.

What I claim is:

1. A group valve for selectively connecting two liquid supply lines separately to a container for conducting liquids into and out of said container, comprising a housing defining first and second valve chambers, each of which is provided with a first liquid connection opening and a second outlet opening, and a third valve chamber which is provided with a liquid connection opening and is separately connected to the first and second chambers through first and second connecting channels respectively, and the valve further comprising first, second and third rotary slides mounted in said first, second and third chambers respectively and operationally coupled to each other in such a way that at any particular time when flow communication between the liquid connection opening of the third chamber and the first liquid connection opening of one of the first and second chambers is open by way of the connecting channel therebetween, the second outlet opening of said one chamber is closed by the slide mounted is said one chamber and flow communication between the liquid connection opening of the third chamber and the first liquid connection opening of the other of the first and second chambers by way of the connecting channel therebetween is closed.

2. A valve as claimed in claim 1, wherein said second outlet openings are arranged in relation to said first liquid connection openings in such a manner that while the slide mounted in said one chamber closes the second outlet opening of said one chamber the slide mounted in said other chamber closes said first liquid connection opening of said other chamber, whereas when the slide mounted in said one chamber closes the connecting channel between the third chamber and said one chamber the slide mounted in said other chamber closes the second outlet opening of said other chamber.

3. A valve as claimed in claim 1, wherein said second outlet openings are arranged in relation to said first liquid connection openings so that while the slide mounted in said one chamber closes the second outlet opening of said one chamber the slide mounted in said other chamber closes the first liquid connection opening of said other chamber and when the slide mounted in said one chamber closes the first liquid connection opening of said one chamber the slide mounted in said other chamber closes the second outlet opening of said other chamber.

4. A valve as claimed in claim 1, wherein said first, second and third slides are operationally coupled to each other in such a way that they have a first operating condition in which the first slide blocks the first liquid connection opening of the first chamber while leaving the second outlet opening open, the second slide blocks the second outlet opening of the second chamber while leaving open both the first liquid connection opening of the second chamber and the second connecting channel, and the third slide blocks the first connecting channel while leaving open both the liquid connection opening of said third chamber and said second connecting channel, and a second operating condition in which the first slide blocks the second outlet opening of the first chamberwhile leaving open both the first liquid connection opening of the first chamber and the first connecting channel, the second slide blocks the second connecting channel while leaving open both the first and second openings of the second chamber and the third slide member leaves open both the first connecting channel and the liquid connection opening of the third chamber.

5. A valve as claimed in claim 1, wherein the first, second and third rotary slides are operationally coupled to each other in such a way that they have a first operating condition in which the first slide blocks the first liquid connection opening of the first chamber while leaving open the second outlet connection thereof, the second slide blocks the second outlet connection of the second chamber while leaving open both the second connecting channel and the first liquid connection opening of the second chamber, and the third slide blocks the first connecting channel while leaving open both the second connnecting channel and the liquid connection opening of said third chamber, and a second operating condition in which the first slide blocks the second outlet opening of the first chamber while leaving open both the first connecting channel and the first liquid connection opening of the first chamber, the second slide blocks the first liquid connection opening of the second chamber while leaving open the second outlet opening thereof, and the third slide blocks the second connecting channel while leaving open the first connecting channel and the liquid connection opening of the third chamber.

6. A valve as claimed in any one of claims 1 to 5, wherein the second outlet opening of each of the first and second chambers is disposed at an angle of 90° from the first liquid connection opening thereof.

* * * * *